T. F. EMANS.
MAIL WEIGHING SCALE.
APPLICATION FILED OCT. 15, 1906.
929,200.
Patented July 27, 1909.
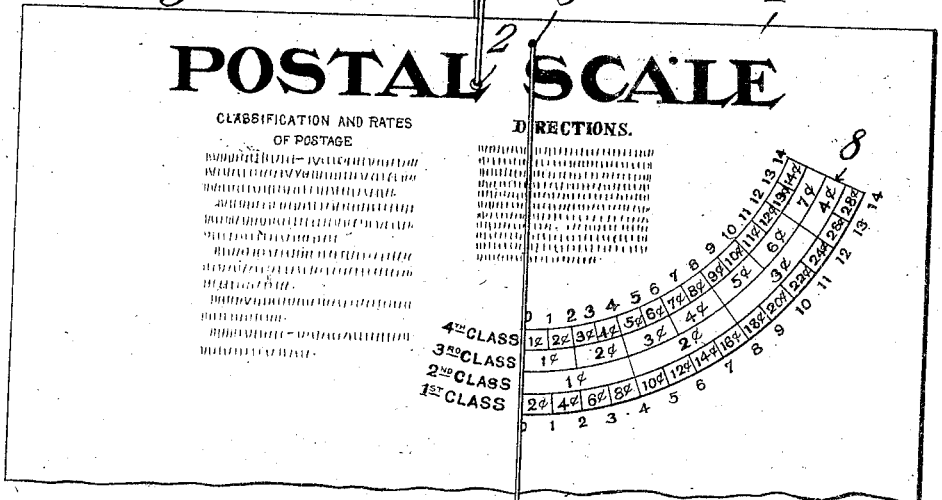
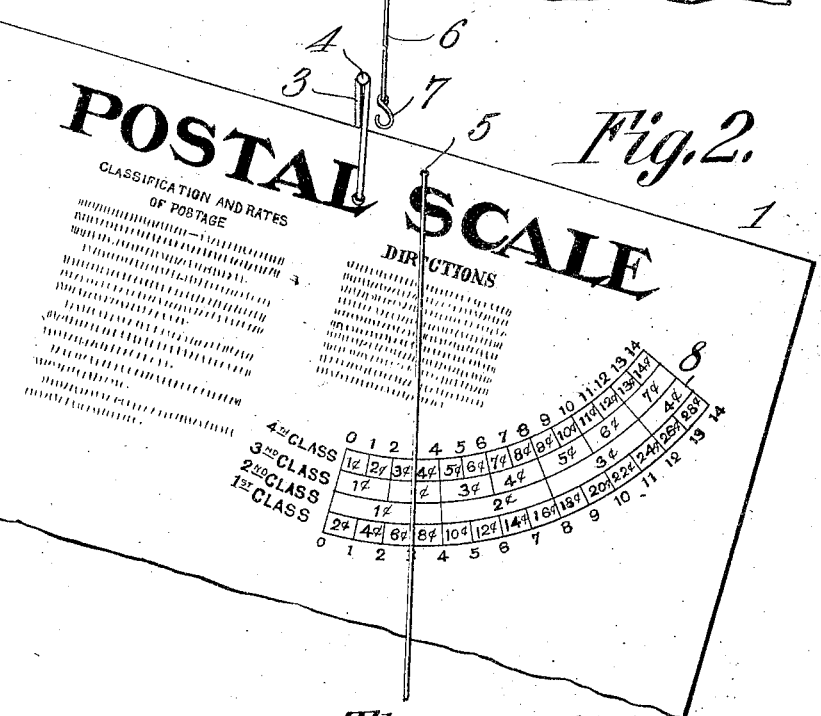
Thedore F. Emans,
INVENTOR.

UNITED STATES PATENT OFFICE.

THEODORE F. EMANS, OF LANSING, MICHIGAN.

MAIL-WEIGHING SCALE.

No. 929,200.  Specification of Letters Patent.  Patented July 27, 1909.

Application filed October 15, 1906. Serial No. 339,029.

*To all whom it may concern:*

Be it known that I, THEODORE F. EMANS, a citizen of the United States, residing at Lansing, in the county of Ingham and State of Michigan, have invented a new and useful Mail-Weighing Scale, of which the following is a specification.

This invention relates to mail weighing scales and its object is to provide a simple device of this character which practically dispenses with the use of bearings, weights, springs and other mechanical features such as ordinarily employed in devices of this character.

A still further object is to provide scales of this character which are inexpensive and can be easily made at any ordinary printing office without the necessity of employing special tools or machinery, and at a cost little greater than that of the material employed.

Another object is to provide scales of this character the parts of which are so arranged as to permit the employment of a considerable area of the body of the scales for advertising purposes.

With the above and other objects in view the invention consists of certain novel features of construction and combinations of parts which will be hereinafter more fully described and pointed out in the claim.

In the accompanying drawings is shown the preferred form of the invention.

In said drawings: Figure 1 is a front elevation of scales constructed in accordance with the present invention, the lower portion of the card constituting the body of the scales when removed; and Fig. 2 is a view similar to Fig. 1 showing one of the positions assumed by the body while an article is being weighed.

Referring to the figures by characters of reference, 1 is the body of the scales the same being preferably made of a sheet of cardboard of suitable proportions having an opening 2 at the center of the upper portion thereof. A cord 3 is looped through this opening and adapted to be suspended from a nail or other device 4 although if desired this cord may be dispensed with and the nail 4 extended directly through the opening 2. A small opening 5 is formed within the body 1 above and to one side of the opening 2 and extending through this opening 5 is a cord 6 suitably fastened to the back of the body and having at its lower end a hook 7 or other means for attaching it to an article to be weighed. The cord 6 is of greater length than the body 1 and is adapted to hang normally in a vertical position. When in its normal position this cord rests upon one end of a scale 8 which is printed or otherwise designated upon the upper portion of the body and is curved in an arc concentric with the opening 5. Said scale is divided into columns designated by the words "1st class," "2nd class," "3rd class," and "4th class" and each column is sub-divided into spaces containing characters indicating the amounts of postage which must be paid upon articles of predetermined weights in the various classes. Numerals are arranged along the upper and lower edges of the scale for indicating ounces. The space between the scale and the top of the body as well as the space to one side of the scale is sufficient to receive data relating to the classification and rates of postage and also directions for using the scale. The body 1 can extend any desired distance below the scale and may have printed thereon a calendar or pictures, etc.

As heretofore stated the cord 6 normally hangs vertically and when the parts are in their normal positions this cord registers with the first or "0" graduation. When it is desired to weigh an article the same is placed in engagement with the hook 7 and released. This will produce a downward pull upon the body 1 at the point 5 which is removed from the point of suspension of the body and therefore the body will be swung to one side as shown in Fig. 2 the weight of the card acting as a counterbalance. When the laterally swung card and the article balance the cord 6 is in a position upon the scale to indicate its weight and the amount of postage which must be paid thereon.

Considerable importance is attached to the fact that pivots, springs, and other mechanical devices are absolutely dispensed with and there are therefore no parts to get out of order and interfere with the proper operation of the device. Importance is also attached to the fact that the scale 8 is so located as to leave considerable room for data relating thereto and also for any advertising matter, illustrations, etc., which it may be desired to indicate upon the card. The cards or bodies 1 can be made in any desired sizes it being only necessary of course to properly proportion the length of the scales with the sizes of the cards and the distance between the openings 2 and 5.

The preferred form of the invention has been set forth in the foregoing description but I do not limit myself thereto as I am aware that modifications may be made therein without departing from the spirit or sacrificing the advantages thereof, and I therefore reserve right to make such changes as fairly fall within the scope of the claim.

What is claimed is:

A letter weighing scale consisting of a rectangular card, a flexible suspending loop connected to the card at a point in the vertical median line of the card, a flexible article suspending element connected to the card to one side of the said vertical median line and at a point above the point of connection of the suspension loop therewith, the said card being provided with a scale extending in the arc of a circle concentric to the point of attachment of the article suspension device to the card, the said card being free of projections and serving as the counter-balancing element of the scale.

In testimony that I claim the foregoing as my own, I have hereto affixed my signature in the presence of two witnesses.

THEODORE F. EMANS.

Witnesses:
RICHARD RUNDABAUGH,
WARREN C. HULL.